No. 689,412. Patented Dec. 24, 1901.
J. RIDLEY.
DRIVING GEAR FOR AUTOMOBILES.
(Application filed Apr. 22, 1901.)
(No Model.) 3 Sheets—Sheet 2.
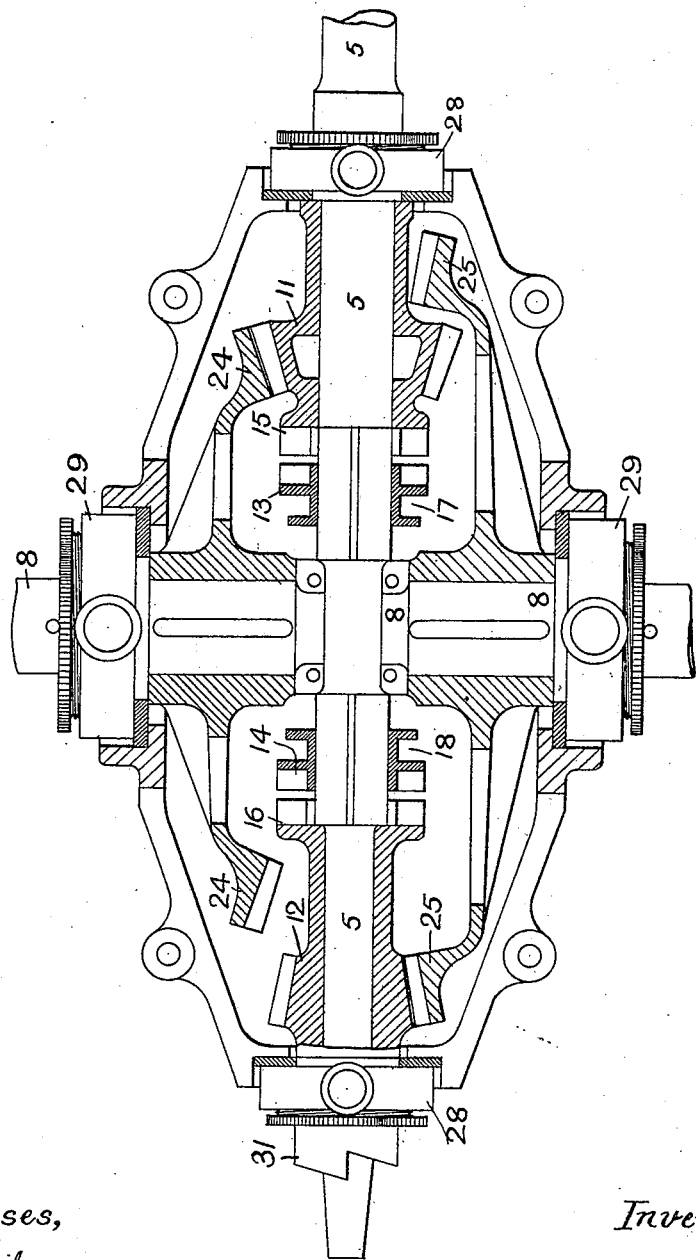
FIG. II.
Witnesses,
Thos. F. Wilson.
John J. Fazakarley
Inventor,
John Ridley.
per.
Douglas Leechman
Attorney No. 689,412. Patented Dec. 24, 1901.
J. RIDLEY.
DRIVING GEAR FOR AUTOMOBILES.
(Application filed Apr. 22, 1901.)
(No Model.) 3 Sheets—Sheet 3.
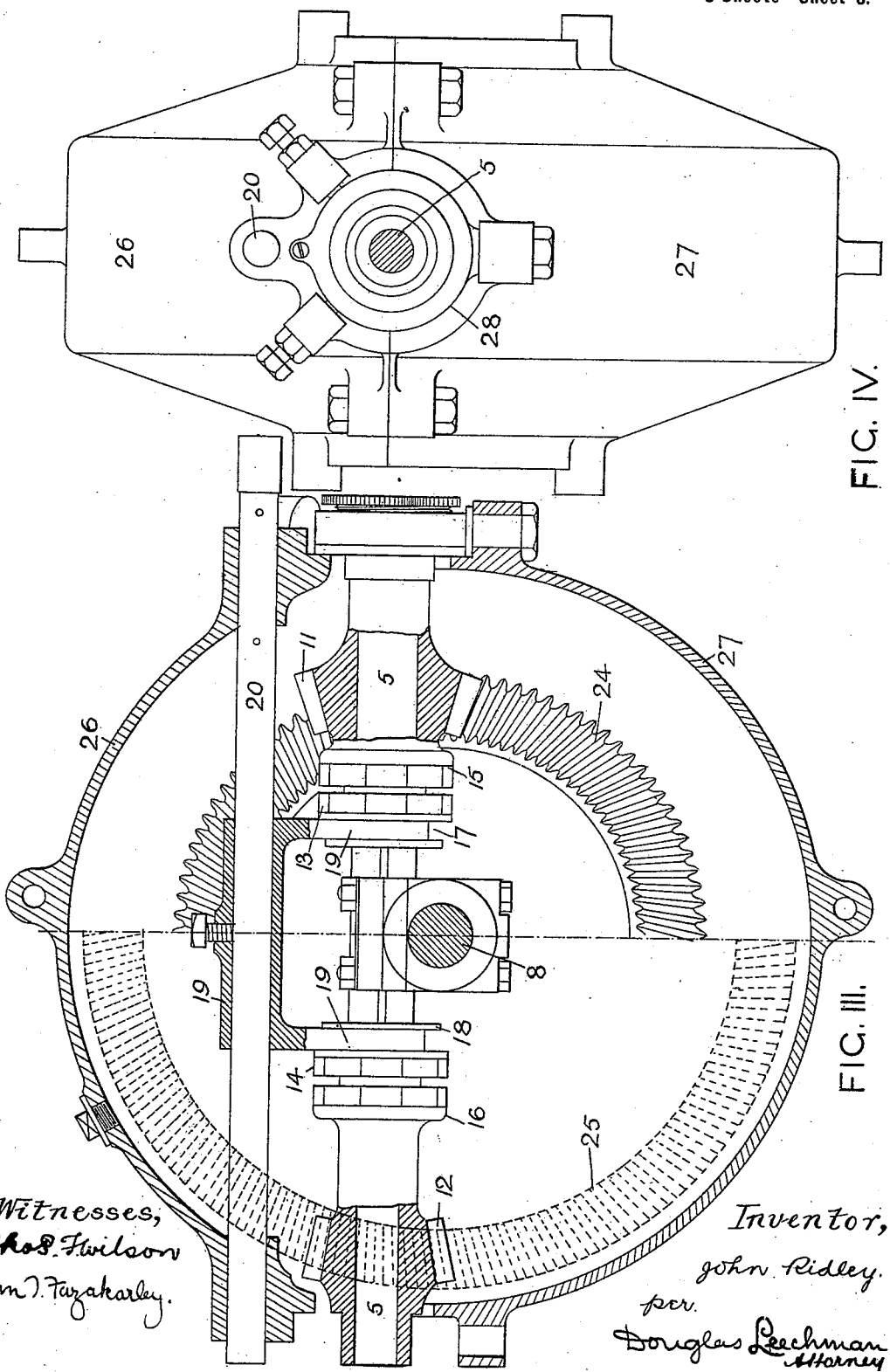

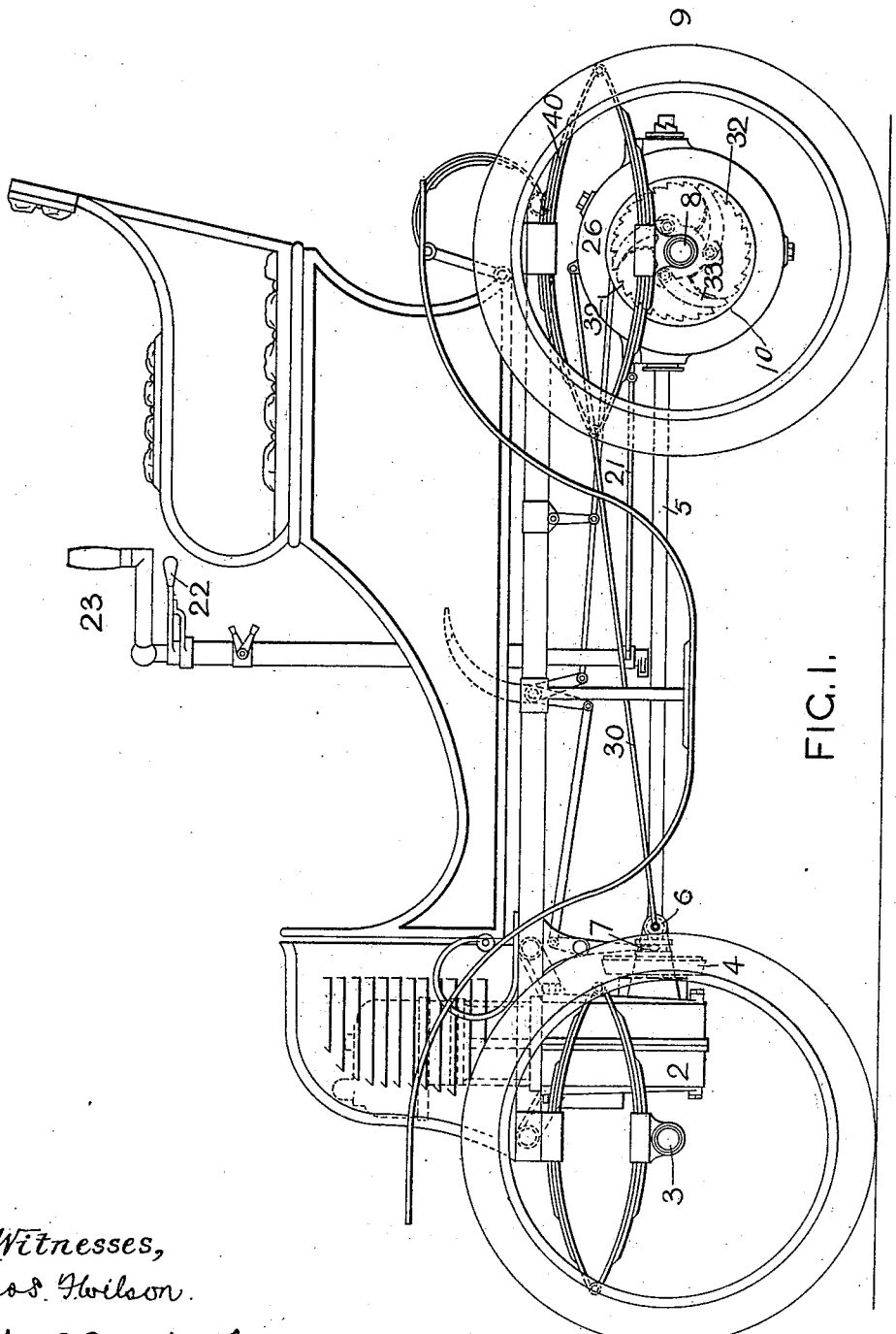

UNITED STATES PATENT OFFICE.

JOHN RIDLEY, OF COVENTRY, ENGLAND.

DRIVING-GEAR FOR AUTOMOBILES.

SPECIFICATION forming part of Letters Patent No. 689,412, dated December 24, 1901.

Application filed April 22, 1901. Serial No. 56,985. (No model.)

*To all whom it may concern:*

Be it known that I, JOHN RIDLEY, a subject of the King of Great Britain, residing at Coventry, in the county of Warwick, England, have invented certain Improvements in Driving-Gear for Automobile Vehicles, of which the following is a specification.

My invention relates to driving-gear for automobile vehicles, and has for its object to provide a simple and strong gearing providing for traveling at various speeds and dispensing with a differential gear; and my invention consists, essentially, in a driving-axle and a driven axle crossing each other in different planes, the driving-axle carrying bevel-pinions adapted to gear positively one at a time with corresponding skew-toothed bevel-wheels on the driven axle, the driving road-wheels being connected to the driven axle by one-way clutches.

In the accompanying drawings, Figure I is a side elevation of an automobile vehicle fitted with driving-gear constructed according to my invention. Fig. II is a sectional plan of the said driving-gear, and Fig. III is a broken sectional elevation of the same. Fig. IV is a rear elevation of the gear-case. Fig. I is drawn to one scale, and Figs. II, III, and IV are drawn to a larger scale.

The same numerals indicate the same parts throughout the drawings.

In carrying out my invention I preferably arrange the motor 2 (which may be of any suitable construction) close behind the front axle 3 and with its crank-shaft lying lengthwise of the vehicle. The motion of the crank-shaft is conveyed through a friction-clutch 4 to a driving-axle 5, which has a universal joint 6 at its forward end. The friction-clutch is controlled by any suitable means, such as a foot-lever acting upon a grooved collar 7, connected to the convex part of the clutch. I dispense with the balance-gear and employ a single-piece driven axle 8, extending from outside to outside of the driving-wheels 9, which are provided with suitable bearings. To allow of the vehicle traveling otherwise than in a straight line, I connect the driving-wheels to their axle by ratchets 32 and pawls 33 or any other suitable form of one-way clutches. When traveling in a straight line, both wheels drive; but when making turns the outer wheel overruns, while the inner wheel alone drives. The boxes 10 of the clutches are fixed to the wheels 9, and their peripheries may be conveniently employed as brake-drums.

I transmit the motion from the axle 5 to the axle 6 at either of two speeds by means of bevel-pinions on the former adapted to gear positively, one at a time, with bevel-wheels on the latter. Any suitable means may be provided for locking and releasing either the bevel-pinions or the bevel-wheels to their respective axles. In Figs. II and III the wheels 24 25 are fixed to the axle 8, and the pinions 11 12 are loose on the axle 5, on which are also mounted, so as to rotate therewith, two slidable jaw-clutches 13 14, which may be moved lengthwise, but cannot rotate relatively to the said axle 5. The jaw-clutches are adapted to engage with suitably-jawed bosses 15 16 on the bevel-pinions and are provided with grooved collars 17 18, adapted to receive the forked ends of a yoke 19, fixed to a striking-bar 20, which may be operated through suitable connections 21 from a lever 22, mounted below the steering-handle 23. The pinion 11 gears permanently with the wheel 24 and the pinion 12 gears permanently with the wheel 25, and as the axles 5 and 8 in order to clear each other necessarily lie in different planes the wheels 24 25 are provided with skew-teeth set at a suitable angle. So long as the parts remain in the position shown no motion will be transmitted to the axle 8; but if the yoke 19 be moved so as to engage the clutch 13 with the pinion 11 the axle 8 and wheels 9 will be rotated at the higher speed, and if the yoke 20 be moved in the opposite direction the pinion 11 will be released and the pinion 12 engaged, so that the axle 8 and wheels 9 will be rotated at the lower speed. The relative positions of the axles 5 8 and the parts of the gearing are secured by a casing made in two parts 26 27, bolted together and furnished with two pairs of bearings—viz., 28 28 for the axle 5 and 29 29 for the axle 8. This construction allows the axle 5 to pitch and the axle 8 to rock without any injurious results. A radius-rod 30 is preferably pivoted in the horizontal center line of the joint 6 in front and is hinged to the case 26 at the back. The rear end of the axle 5 may be produced and fitted with a cam-collar 31 to receive a handle for starting the motor.

Additional forward speeds may be obtained by providing additional bevel pinions, wheels, clutches, and the like. For forward driving the bevel-pinions in front of the axle 8 gear with bevel-wheels on one side of the axle 5 and the bevel-pinions behind the axle 8 gear with bevel-wheels on the other side of the axle 5.

What I claim, and desire to secure by Letters Patent of the United States, is—

1. In driving-gear for automobile vehicles, the combination of a driving-axle, a driven axle crossing the said driving-axle and lying in a different plane, a bevel-pinion adapted to rotate with the driving-axle, and a skew-toothed bevel-wheel adapted to rotate with the driven axle and to gear positively with the said bevel-pinion, substantially as set forth.

2. In driving-gear for automobile vehicles, the combination of a driving-axle, a driven axle crossing the said driving-axle and lying in a different plane, bevel-pinions on the driving-axle, skew-toothed bevel-wheels on the driven axle and means for locking each couple of gears one at a time, substantially as set forth.

3. In driving-gear for automobile vehicles, the combination of a driving-axle, a driven axle, crossing the said driving-axle and lying in a different plane, bevel-pinions on the driving-axle, skew-toothed bevel-wheels on the driven axle, means for locking each couple of gears one at a time, driving road-wheels, and one-way clutches introduced between the said road-wheels and the said driven axle, substantially as and for the purpose set forth.

4. In driving-gear for automobile vehicles, the combination of a driving-axle, a driven axle crossing the said driving-axle and lying in a different plane, bevel-pinions loose on the driving-axle, the said bevel-pinions having jawed bosses, jaw-clutches rotatable with and slidable on the said driving-axle, bevel-wheels fixed to the driven axle and gearing with the respective bevel-pinions, and means for sliding the said jaw-clutches into and out of engagement with the respective bevel-pinions, substantially as and for the purpose set forth.

5. In driving-gear for automobile vehicles, the combination of a driving-axle, a driven axle crossing the said driving-axle and lying in a different plane, bevel-pinions loose on the driving-axle, the said bevel-pinions having jawed bosses, jaw-clutches rotatable with and slidable on the said driving-axle, and having grooved collars, a yoke having forked ends adapted to engage with the said collars, means for moving the said yoke, bevel-wheels fixed to the driven axle and gearing with the respective bevel-pinions, driving road-wheels, and one-way clutches introduced between the said road-wheels and the said driven axle, substantially as and for the purpose set forth.

6. In driving-gear for automobile vehicles, the combination of a driving-axle, a driven axle crossing the said driving-axle, and lying in a different plane, a bevel-pinion adapted to rotate with the driven axle, a skew-toothed bevel-wheel adapted to rotate with the driven axle and to gear positively with the said bevel-pinion, a pair of bearings adapted to receive the driving-axle, another pair of bearings adapted to receive the driven axle, and a casing connecting the said bearings, substantially as and for the purposes set forth.

7. In driving-gear for automobile vehicles, the combination of a driving-axle, a driven axle crossing the said driving-axle and lying in a different plane, bevel-pinions loose on the driving-axle, the said bevel-pinions having jawed bosses, jaw-clutches rotatable with and slidable on the said driving-axle, and having grooved collars, a yoke having forked ends adapted to engage with the said collars, means for moving the said yoke, bevel-wheels fixed to the driven axle and gearing with the respective bevel-pinions, driving road-wheels, one-way clutches introduced between the said road-wheels and the said driven axle, a pair of bearings adapted to receive the driving-axle, another pair of bearings adapted to receive the driven axle, and a casing connecting the said bearings, substantially as and for the purposes set forth.

8. In driving-gear for automobile vehicles, the combination of a motor, a driving-axle having a universal joint, a friction-clutch introduced between the said motor and the said joint, means for engaging and disengaging the said friction-clutch, a driven axle crossing the said driving-axle and lying in a different plane, bevel-pinions loose on the driving-axle, the said bevel-pinions having jawed bosses, jaw-clutches rotatable with and slidable on the said driving-axle and having grooved collars, a yoke having forked ends adapted to engage with the said collars, means for moving the said yoke, bevel-wheels fixed to the driven axle and gearing with the respective bevel-pinions, driving road-wheels, one-way clutches introduced between the said road-wheels and the said driven axle, a pair of bearings adapted to receive the driving-axle, another pair of bearings adapted to receive the driven axle, a casing connecting the said bearings, and a radius-rod having one end pivoted in the horizontal center line of the said universal joint and having the other end hinged to the said casing, substantially as and for the purposes set forth.

In testimony whereof I have signed my name to this specification in the presence of two subscribing witnesses.

JOHN RIDLEY.

Witnesses:
DOUGLAS LEECHMAN,
THOS. F. WILSON.